(12) United States Patent
Kuwabara (10) Patent No.: US 11,858,789 B2
(45) Date of Patent: Jan. 2, 2024

(54) VEHICLE WITH AERIAL WORK PLATFORM

(71) Applicant: KABUSHIKI KAISHA AICHI CORPORATION, Saitama (JP)

(72) Inventor: Yoshio Kuwabara, Ageo (JP)

(73) Assignee: KABUSHIKI KAISHA AICHI CORPORATION, Saitama (JP)

( * ) Notice: Subject to any disclaimer, the term of this patent is extended or adjusted under 35 U.S.C. 154(b) by 798 days.

(21) Appl. No.: 16/976,360

(22) PCT Filed: Mar. 7, 2019

(86) PCT No.: PCT/JP2019/009167
§ 371 (c)(1),
(2) Date: Aug. 27, 2020

(87) PCT Pub. No.: WO2019/172391
PCT Pub. Date: Sep. 12, 2019

(65) Prior Publication Data
US 2021/0047163 A1    Feb. 18, 2021

(30) Foreign Application Priority Data

Mar. 9, 2018  (JP) ................................ 2018-042789

(51) Int. Cl.
*B66F 17/00* (2006.01)
*B66F 11/04* (2006.01)
*G01G 19/08* (2006.01)

(52) U.S. Cl.
CPC ............ *B66F 11/04* (2013.01); *B66F 17/006* (2013.01); *G01G 19/083* (2013.01)

(58) Field of Classification Search
CPC ................................ B66F 11/04; B66F 11/046
(Continued)

(56) References Cited

U.S. PATENT DOCUMENTS 3,858,688 A * 1/1975 Galloway ............... B66F 11/04
                                                              187/244
3,871,478 A * 3/1975 Bushnell, Jr. ........... B66F 11/04
                                                              182/148

(Continued)

FOREIGN PATENT DOCUMENTS

CA       3000080 A1 *  9/2018  .............. B66F 11/04
CN     115259037 A  *  11/2022
(Continued)

OTHER PUBLICATIONS

International Preliminary Report on Patentability and Written Opinion issued in PCT/JP2019/009167; dated Sep. 24, 2020.
(Continued)

*Primary Examiner* — Jerry E Redman
(74) *Attorney, Agent, or Firm* — Studebaker & Brackett PC (57) ABSTRACT

A load detection means (180) that finds the live load on a work platform by detecting a load applied to a fifth mast member (150) is provided on the fifth mast member (150) provided on the work platform; a plurality of sliders (top-rear side fourth slider (155), bottom-rear side fourth slider (156), top-front side fourth slider (157), and bottom-front side fourth slider (158)) that allows the fifth mast member (150) and the fourth mast member to move relative to each other is provided in different locations in the vertical direction between the fifth mast member (150) and the fourth mast member; and the plurality of sliders are fixed to the fifth mast member (150).

5 Claims, 8 Drawing Sheets

(58) Field of Classification Search
USPC .......................................................... 182/69.4
See application file for complete search history.

(56) References Cited

U.S. PATENT DOCUMENTS

| | | | | |
|---|---|---|---|---|
| 4,468,904 A * | 9/1984 | O'Malley | ................. | E04G 1/22 |
| | | | | 254/364 |
| 4,848,520 A * | 7/1989 | Gibel | ....................... | B66F 9/08 |
| | | | | 414/629 |
| 2023/0249955 A1 * | 8/2023 | Oba | ..................... | B66F 17/006 |
| | | | | 182/19 |

FOREIGN PATENT DOCUMENTS

| | | | | |
|---|---|---|---|---|
| DE | 202012002142 U1 * | 5/2012 | ............. | B66F 11/04 |
| EP | 0590409 A1 * | 4/1994 | | |
| JP | H06-045984 U | 6/1994 | | |
| JP | 2000-128497 A | 5/2000 | | |
| JP | 2003-252591 A | 9/2003 | | |
| JP | 2007-326680 A | 12/2007 | | |
| JP | 2014-094802 A | 5/2014 | | |
| JP | 2016-011014 A | 1/2016 | | |
| JP | 2022075449 A * | 5/2022 | ............. | B60L 50/66 |

OTHER PUBLICATIONS

International Search Report issued in PCT/JP2019/009167; dated Apr. 9, 2019.

An Office Action; "Notice of Reasons for Refusal," mailed by the Japanese Patent Office dated Jan. 10, 2023, which corresponds to Japanese Patent Application No. 2020-505119 and is related to U.S. Appl. No. 16/976,360; with English language translation.

\* cited by examiner

VEHICLE WITH AERIAL WORK PLATFORM

TECHNICAL FIELD

The present invention relates to a vehicle with an aerial work platform configured to lift and lower a work platform using a lifting and lowering apparatus.

TECHNICAL BACKGROUND

Some vehicles with aerial work platforms are configured such that the work platforms that allow operators to board thereon are vertically lifted and lowered by vertical mast-type lifting and lowering apparatuses configured by a plurality of mast members assembled in a telescopic form so as to be able to extend and contract (see Patent Literature 1, for example). In such a vehicle with an aerial work platform, a rated load is provided in terms of safety. The rated load of a work platform is a maximum allowable load which can be mounted on the work platform and is set in terms of securing of strength and safety of a lifting and lowering apparatus. It is not desirable to perform aerial work in a state in which a load that is equal to or greater than the rated load acts on the work platform.

Thus, such a vehicle with an aerial work platform is provided with load detection means for detecting the mounted load on the work platform in order to detect whether or not the mounted load on the work platform falls within the rated load. Examples of such load detection means include load detection means configured to detect a mounted load on a work platform, using a working pressure of a hydraulic cylinder that extends and contracts a plurality mast members provided at a lifting and lowering apparatus.

PRIOR ARTS LIST

Patent Document

Patent Literature 1: Japanese Laid-Open Patent Publication No. 2003-252591(A)

SUMMARY OF THE INVENTION

Problems to be Solved by the Invention

However, when the lifting and lowering apparatus operates to be lifted or lowered in such a vehicle with an aerial work platform, intervals of sliders provided at each mast member may change with the plurality of mast members being extended and contracted, a sliding resistance between the mast members may change, and this may cause degradation of accuracy of detection of a load on the work platform using the load detection means.

The present invention was made in view of such a problem, and an object thereof is to provide a vehicle with an aerial work platform capable of enhancing accuracy of detection of a load on a work platform.

Means to Solve the Problems

In order to achieve such an object, a vehicle with an aerial work platform according to the present invention includes: a vehicle body (for example, a traveling carriage 2 according to an embodiment) that is able to travel; a lifting and lowering apparatus that is provided in the vehicle body; and a work platform that is provided on the lifting and lowering apparatus and allows an operator to board thereon, the lifting and lowering apparatus has a plurality of mast members that are provided at the vehicle body so as to extend in an up-down direction and are allowed to extend and contract by being assembled in a telescopic form so as to be able to relatively move in the up-down direction, and extending and contracting means for causing the plurality of mast members to extend and contract in the up-down direction, the plurality of mast members include a top mast member (for example, a fifth mast member 150 according to the embodiment) that is disposed on an outermost side on which the work platform is provided and a top-side intermediate mast member (for example, a fourth mast member 140 according to the embodiment) that is assembled in a telescopic form inside the top mast member so as to be able to relatively move in the up-down direction, the top mast member is provided with load detection means for detecting a load applied to the top mast member and obtaining a mounted load on the work platform, a plurality of sliders that allow the top mast member and the top-side intermediate mast member to relatively move are disposed between the top mast member and the top-side intermediate mast member at positions that are different from each other in the up-down direction, and the plurality of sliders are secured to the top mast member.

Preferably, in the aforementioned vehicle with an aerial work platform, the plurality of mast members include a base-side intermediate mast member (for example, a third mast member 130 according to the embodiment) that is assembled in a telescopic form inside the top-side intermediate mast member so as to be able to relatively move in the up-down direction, the extending and contracting means has an actuator (for example, a third cylinder 163 according to the embodiment) that causes the top-side intermediate mast member to relatively move in the up-down direction with respect to the base-side intermediate mast member, a rotatable sprocket that is provided at an upper portion of the top-side intermediate mast member, and a chain that is put around the sprocket, is connected to an upper portion of the base-side intermediate mast member on one end side, and is connected to a lower portion of the top mast member on the other end side, and the load detection means has a bracket member that is connected to the other end side of the chain, is disposed at the lower portion of the top mast member, and is able to relatively move in the up-down direction with respect to the top mast member, biasing means (for example, a spring member for a chain 183 according to the embodiment), which is provided between the lower portion of the top mast member and the bracket member, for applying a bias force against a load acting on the bracket member from the top mast member and keeping an up-down relative position of the top mast member at a predetermined position with respect to the bracket member, and a position detector (for example, a limit switch 185 according to the embodiment) that detects the up-down relative position of the top mast member with respect to the bracket member that changes in accordance with the load applied to the top mast member.

Preferably, in the aforementioned vehicle with an aerial work platform, the load detection means is provided at the lower portion of the top mast member, and roller members that are rotatable while abutting on the top-side intermediate mast member are provided in the vicinity of the load detection means at the lower portion of the top mast member.

Advantageous Effects of the Invention

According to the present invention, the plurality of sliders disposed between the top mast member and the top-side intermediate mast member are secured to the top mast member, and the positional relationships of the sliders between the top mast member and the top-side intermediate mast member are thus constant even if the top mast member and the top-side intermediate mast member relatively move when the plurality of mast members extend or contract. In this manner, a moment of a force acting on the sliders between the top mast member and the top-side intermediate mast member does not change even if the top mast member and the top-side intermediate mast member relatively move, and a sliding resistance between the top mast member and the top-side intermediate mast member is thus substantially constant. Therefore, it is possible to enhance accuracy of detection of a load on the work platform using the load detection means configured to detect the load applied to the top mast member and to obtain the mounted load on the work platform.

Also, the load detection means is configured to have the bracket member that is able to relatively move in the up-down direction with respect to the top mast member, the biasing means for applying a bias force against the load acting on the bracket member from the top mast member and keeping the up-down relative position of the top mast member at the predetermined position with respect to the bracket member, and the position detector that detects the up-down relative position of the top mast member with respect to the bracket member that changes in accordance with the load applied to the top mast member. Since the load detection means has a simple configuration as described above, it is possible to enhance accuracy of detection of the load on the work platform using the load detection means and to reduce manufacturing costs of the vehicle with an aerial work platform.

Also, the roller members that are rotatable while abutting on the top-side intermediate mast member are provided in the vicinity of the load detection means at the lower portion of the top mast member. In this manner, even in a case in which the load detection means is provided at the lower portion of the top mast member and it is difficult to dispose the sliders at the disposition position of the load detection means between the top mast member and the top-side intermediate mast member, it is possible to guide relative movement between the top mast member and the top-side intermediate mast member using the roller members provided at the top mast member. Even with such a configuration, the sliding resistance between the topmast member and the top-side intermediate mast member becomes substantially constant, and it is possible to enhance accuracy of detection of the load on the work platform using the load detection means.

DESCRIPTION OF THE EMBODIMENTS

Hereinafter, a preferred embodiment of the present invention will be described with reference to drawings. First, a schematic configuration of a vehicle with an aerial work platform 1 will be described with reference to FIG. 2. Note that the following description will be given by defining the arrow directions illustrated in FIG. 2 as front, back, upper, and lower sides for convenience of explanation.

Figure 2:
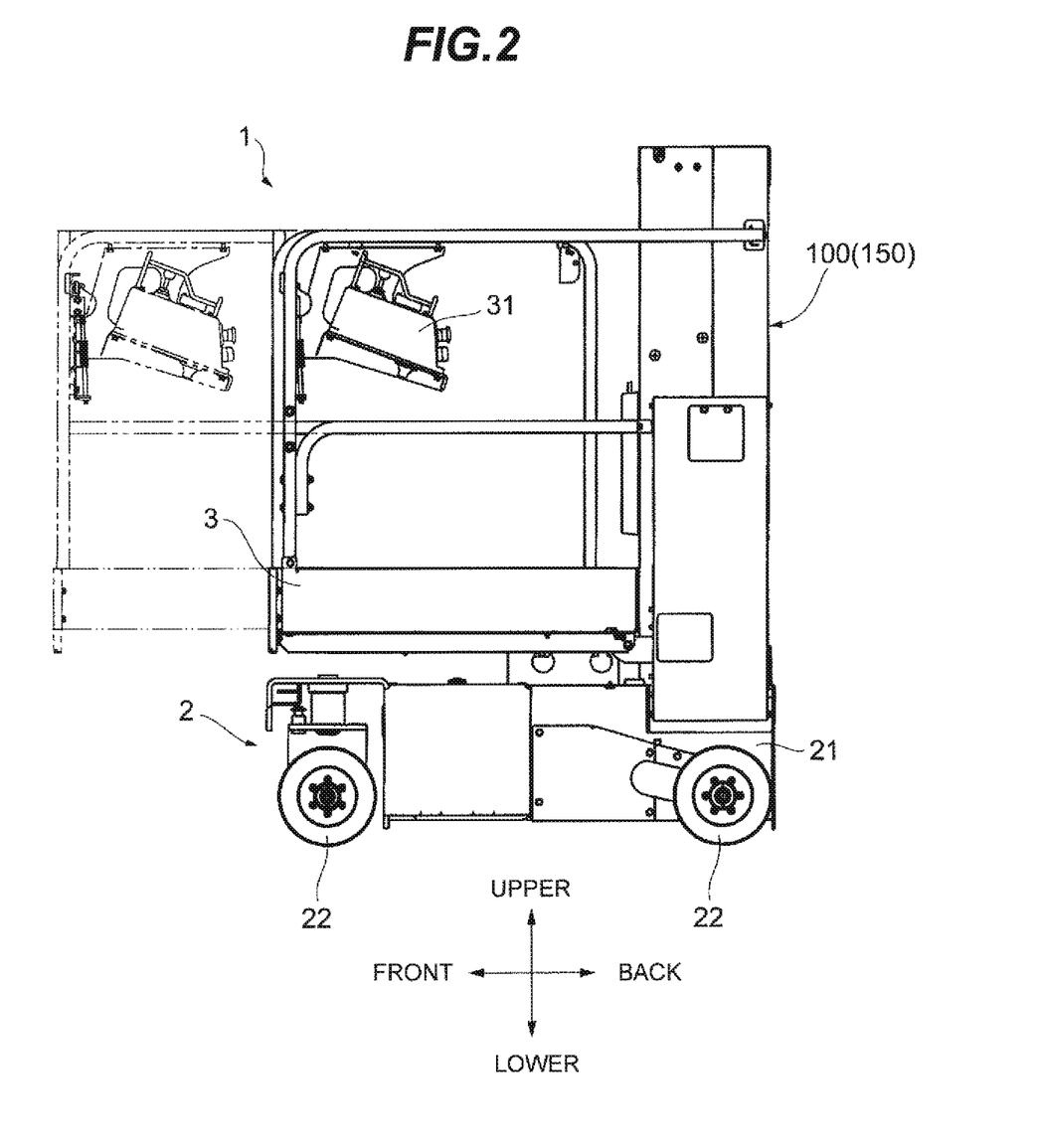
FIG. 2 is a side view of a vehicle with an aerial work platform.
Figure 3:
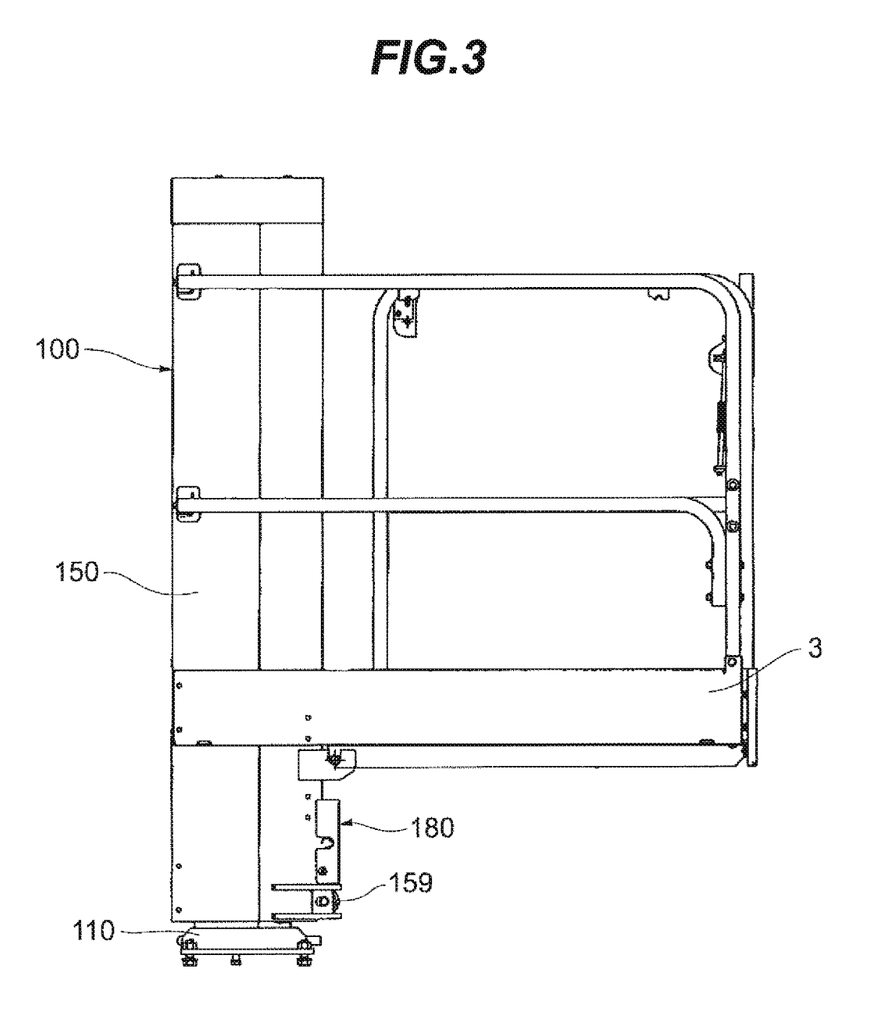
FIG. 3 is a side view of a lifting and lowering apparatus and a work platform.

The vehicle with an aerial work platform 1 is configured to have a traveling carriage 2 that can travel, a work platform 3 that allows an operator to board thereon, and a lifting and lowering apparatus 100 that projects upward from a back portion of the traveling carriage 2 to lift and lower the work platform 3 as illustrated in FIG. 2. The traveling carriage 2 is configured to have a carriage main body 21, traveling wheels 22 provided on the front, back, left and right sides of the carriage main body 21, and an electric powered traveling motor (not illustrated) that drives the traveling wheels 22 to cause the carriage main body 21 to travel. The work platform 3 is provided at a fifth mast member 150 of the lifting and lowering apparatus 100 so as to project forward. The work platform 3 is located above the traveling carriage 2 and is configured to be able to extend and contract in the front-back direction (see the two-dotted dashed line in FIG. 2). The work platform 3 is provided with an operation device 31 with which the boarding operator performs operations.

Figure 4:
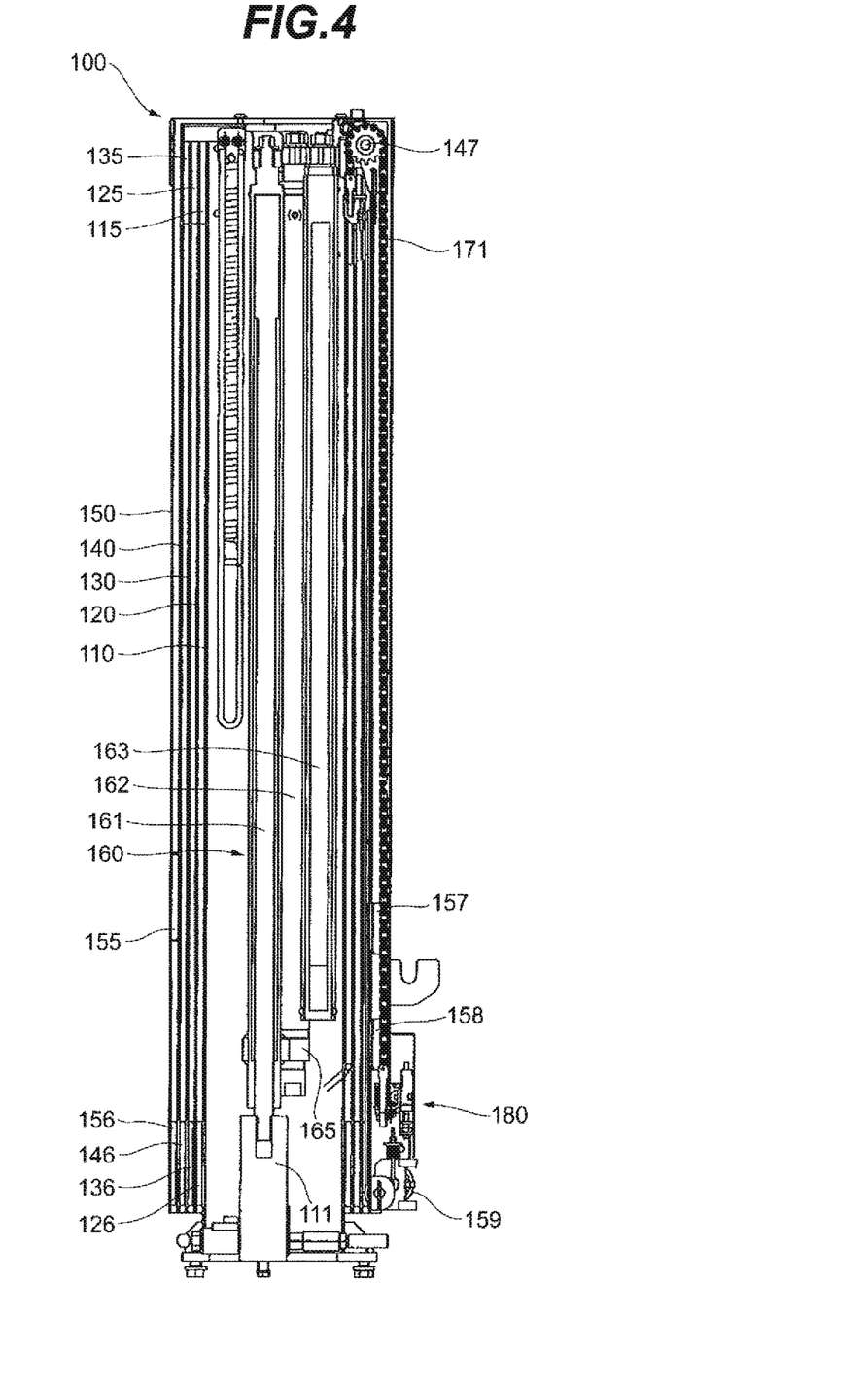
FIG. 4 is a side sectional view of the lifting and lowering apparatus.
Figure 5A:
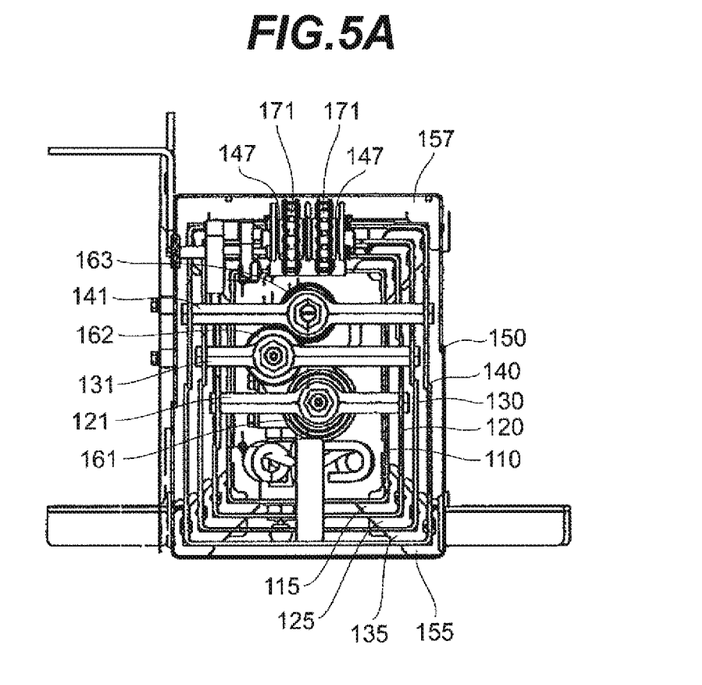
FIG. 5A is a planar sectional view of an upper portion of the lifting and lowering apparatus.
Figure 5B:
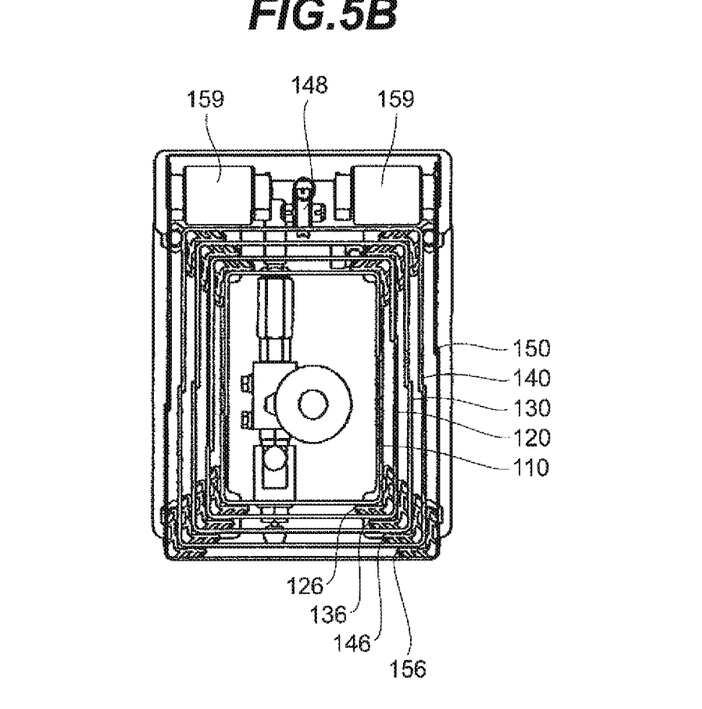
FIG. 5B is a planar sectional view of a lower portion of the lifting and lowering apparatus.
Figure 6:
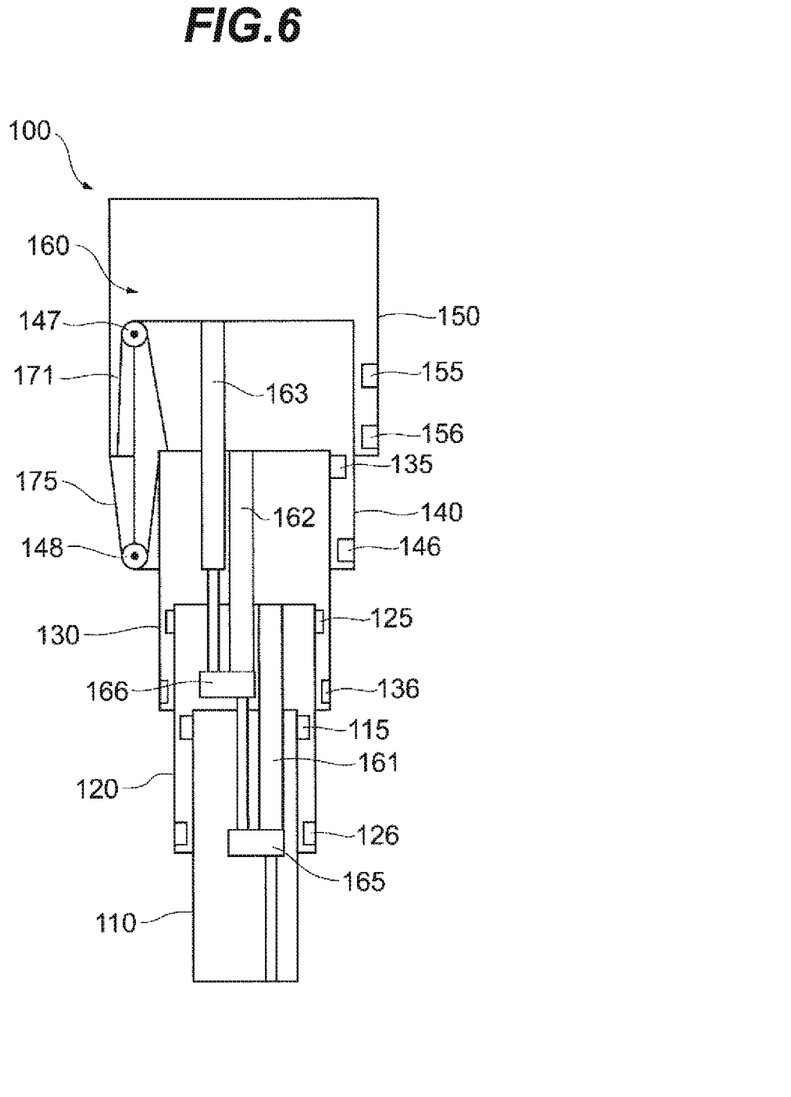
FIG. 6 is a schematic view illustrating an internal structure of the lifting and lowering apparatus.

The lifting and lowering apparatus 100 of the vehicle with an aerial work platform 1 will be described with reference to FIGS. 3 to 7. The lifting and lowering apparatus 100 is configured to have first to fifth mast members 110 to 150, extending and contracting means 160 (see FIGS. 4 and 6), and load detection means 180 (see FIG. 4) as illustrated in FIGS. 3 to 6. The first mast member 110 is formed into a tubular shape with a substantially rectangular sectional view and is provided so as to stand at a back portion of the traveling carriage 2. The second mast member 120 is formed into a tubular shape with a substantially rectangular sectional view and is disposed outside the first mast member 110 so as to be able to relatively move in the up-down direction. The third mast member 130 is formed into a tubular shape with a substantially rectangular sectional view and is disposed outside the second mast member 120 so as to be able to relatively move in the up-down direction. The fourth mast member 140 is formed into a tubular shape with a substantially rectangular sectional view and is disposed outside the third mast member 130 so as to be able to relatively move in the up-down direction. The fifth mast member 150 is formed into a tubular shape with a substantially rectangular sectional view and is disposed outside the fourth mast member 140 so as to be able to move in the up-down direction. The fifth mast member 150 is provided with the work platform 3 (see FIG. 3). As illustrated in FIG. 6, the first to fifth mast members 110 to 150 are assembled in a telescopic form so as to be able to relatively move in the up-down direction and are configured to be able to extend and contract in the up-down direction.

The extending and contracting means 160 is configured to have first to third cylinders 161 to 163, a sprocket 147, a sheave 148, a chain 171, and a wire 175 as illustrated in FIG. 6. The first cylinder 161 is a hydraulic cylinder and causes the second mast member 120 to relatively move in the up-down direction with respect to the first mast member 110. The distal end portion of a rod of the first cylinder 161 is connected to a first cylinder coupling portion 111 (see FIGS. 4 and 5B) provided inside a lower end portion of the first mast member 110. The proximal end portion of a tube of the first cylinder 161 is connected to a second cylinder coupling portion 121 (see FIG. 5A) provided inside an upper end portion of the second mast member 120.

The second cylinder 162 is a hydraulic cylinder and causes the third mast member 130 to relatively move in the up-down direction with respect to the second mast member 120. A distal end portion of a rod of the second cylinder 162 is connected to the distal end portion of the tube of the first cylinder 161 via the first cylinder coupling member 165 (see FIG. 4 as well). The proximal end portion of the tube of the second cylinder 162 is connected to a third cylinder coupling portion 131 (see FIG. 5A) provided inside an upper end portion of the third mast member 130.

The third cylinder 163 is a hydraulic cylinder and causes the fourth mast member 140 to relatively move in the up-down direction with respect to the third mast member 130. The distal end portion of a rod of the third cylinder 163 is connected to the distal end portion of the tube of the second cylinder 162 via the second cylinder coupling member 166. The proximal end portion of a tube of the third cylinder 163 is connected to a fourth cylinder coupling portion 141 (see FIG. 5A) provided inside an upper end portion of the fourth mast member 140.

Figure 7:
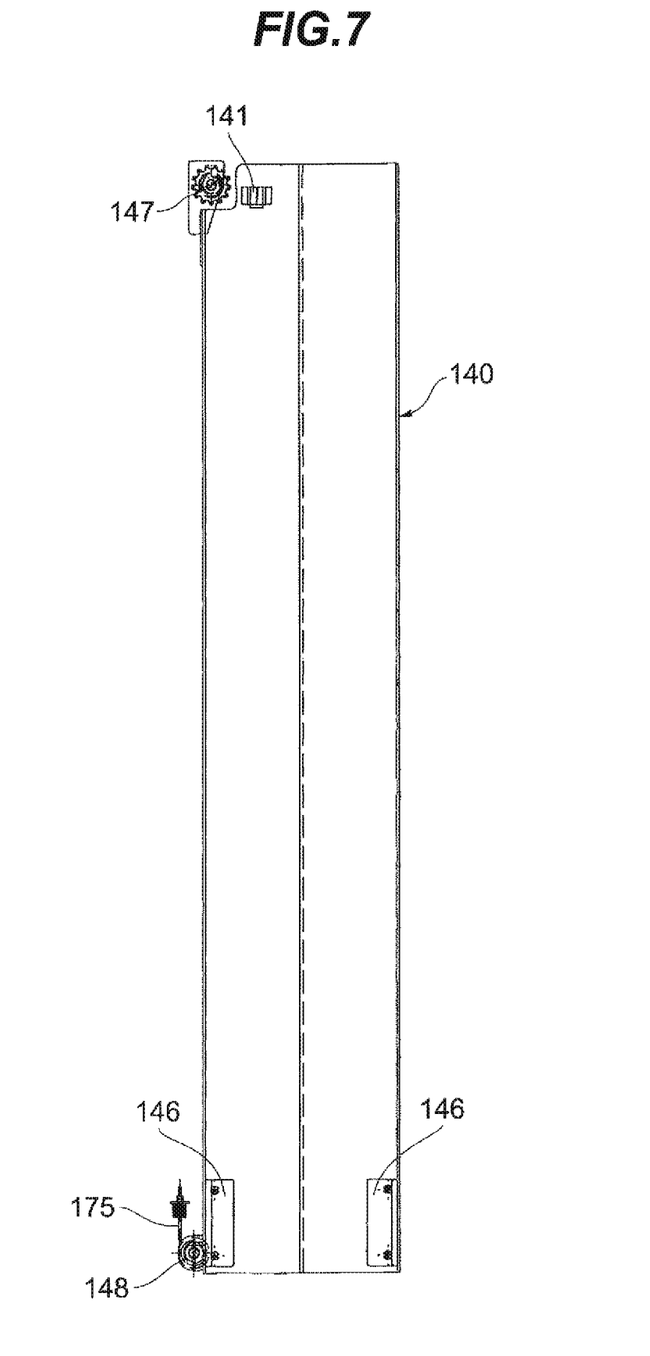
FIG. 7 is a side sectional view of a fourth mast member (top-side intermediate mast member).

The sprocket 147 is rotatably attached to a front upper end portion of the fourth mast member 140 (see FIG. 7 as well). The chain 171 is put around the sprocket 147, one end side of the chain 171 extends downward and is connected to the upper portion of the third mast member 130, and the other end side of the chain 171 extends downward and is connected to the lower portion of the fifth mast member 150 (through a clearance between the fourth mast member 140 and the fifth mast member 150). In this manner, if the fourth mast member 140 relatively moves upward with respect to the third mast member 130, then the fifth mast member 150 is pulled upward via the sprocket 147 and the chain 171 and relatively moves upward with respect to the fourth mast member 140. Note that two sets of sprockets 147 and chains 171 are provided in an aligned manner on the left and right sides.

A sheave 148 is rotatably attached to a front lower end portion of the fourth mast member 140 (see FIG. 7 as well). The wire 175 is put around the sheave 148, one end side of the wire 175 extends upward and is connected to the upper portion of the third mast member 130 (through a clearance between the third mast member 130 and the fourth mast member 140), and the other end side of the wire 175 extends upward and is connected to the lower portion of the fifth mast member 150. In this manner, if the fourth mast member 140 relatively moves downward with respect to the third mast member 130, then the fifth mast member 150 is pulled downward via the sheave 148 and the wire 175 and relatively moves downward with respect to the fourth mast member 140. The wire 175 with both ends secured to the third mast member 130 and the fifth mast member 150 is also adapted to prevent the fourth mast member 140 from dropping.

Figure 8:
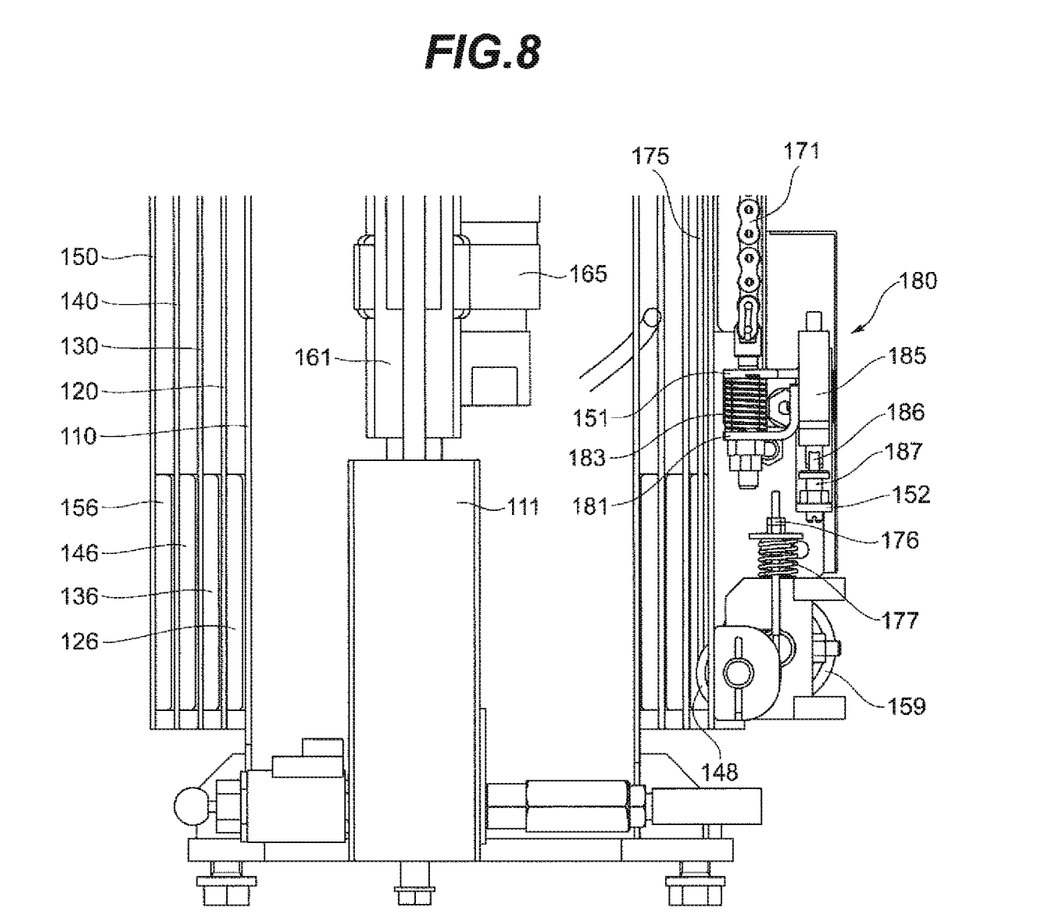
FIG. 8 is an enlarged sectional view illustrating the lower portion of the lifting and lowering apparatus.

Next, the load detection means 180 of the lifting and lowering apparatus 100 will be described with additional reference to FIG. 8. The load detection means 180 is configured to have a bracket member 181, a spring member for a chain 183, a limit switch 185, and a switch abutting member 187 as illustrated in FIG. 8. The bracket member 181 is formed into an L-shaped plate shape and is connected to the other end portion of the chain 171 using a coupling member such as a nut (not illustrated). The spring member for a chain 183 is configured using a compression coil spring and is attached to a lower surface side of a spring receiving portion 151 provided at an inner lower portion of the fifth mast member 150 (on the front side) in a secured manner.

The spring receiving portion 151 is formed into a plate shape having a chain insertion hole (not illustrated). The other end side of the chain 171 is inserted into the chain insertion hole so as to be able to relatively move in the up-down direction such that the other end portion of the chain 171 is located below the spring receiving portion 151. The bracket member 181 is connected to the other end portion of the chain 171 in a state in which the other end portion of the chain 171 is located below the spring receiving portion 151, such that the spring member for a chain 183 is sandwiched between the bracket member 181 and the spring receiving portion 151. In this manner, the bracket member 181 is disposed at the inner lower portion of the fifth mast member 150 along with the other end portion of the chain 171, and the fifth mast member 150 is configured to be able to relatively move in the up-down direction with respect to the bracket member 181. The spring member for a chain 183 applies a bias force upward such that the fifth mast member 150 is kept at a predetermined non-mounted position with respect to the bracket member 181. In the embodiment, the non-mounted position is a relative position of the fifth mast member 150 (with respect to the bracket member 181) in a state in which nothing has been loaded on the work platform 3.

The limit switch 185 is a rod-type limit switch and is attached to a side portion of the bracket member 181. A rod portion 186 of the limit switch 185 is formed into a bar shape with a roller provided at the distal end and extends downward to face the switch abutting member 187. In this manner, the limit switch 185 is turned into an ON state when the switch abutting member 187 abuts on the rod portion 186 and the rod portion 186 is pressed by the switch abutting member 187.

The switch abutting member 187 is formed into a bolt shape and is attached to an abutting member attachment portion 152, which is provided at the inner lower portion of the fifth mast member 150 (on the front side) in a secured manner, so as to project upward therefrom. The switch abutting member 187 is screwed and attached to the abutting member attachment portion 152, and it is possible to adjust the amount of projection of the switch abutting member 187 with respect to the abutting member attachment portion 152 by screw-rotating the switch abutting member 187. In a case in which the mounted load on the work platform 3 falls within a rated load, the amount of projection of the switch abutting member 187 is adjusted such that the switch abutting member 187 abuts on the rod portion 186 of the limit switch 185 and the limit switch 185 is in an ON state.

Note that two sets of bracket members 181, spring member for a chain 183, limit switches 185, and switch abutting members 187 are provided in accordance with the sprockets 147 and the chains 171. Also, the other end portion of the wire 175 is secured to the inner lower portion of the fifth mast member 150 (on the front side) provided with the load detection means 180, using a wire securing member 176. The wire securing member 176 is provided with a spring member for a wire 177 for alleviating an impact force applied to the wire 175. Roller members 159 that are rotatable while abutting on the outside of the fourth mast member 140 are attached to the vicinities of the left and right sides of the load detection means 180 at the lower portion of the fifth mast member 150 (on the front side).

Next, sliders provided in the clearances of the first to fifth mast members 110 to 150 will be described with additional reference to FIG. 1. As illustrated in FIGS. 4, 5A, and 5B, an upper first slider 115 and a lower first slider 126 that allow the first mast member 110 and the second mast member 120 to relatively move are disposed at each of four corners of the clearance between the first mast member 110 and the second mast member 120. The upper first slider 115 and the lower first slider 126 are formed into L-shaped plate shapes using a resin material. The upper first slider 115 is secured to an outer corner of the upper portion of the first mast member 110 such that an inner corner of the second mast member 120 is brought into slidable contact therewith. The lower first slider 126 is disposed below the upper first slider 115 in the clearance between the first mast member 110 and the second mast member 120. The lower first slider 126 is secured to an inner corner of the lower portion of the second mast member 120 such that an outer corner of the first mast member 110 is brought into slidable contact therewith.

An upper second slider 125 and a lower second slider 136 that allow the second mast member 120 and the third mast member 130 to relatively move are disposed at each of four corners of the clearance between the second mast member 120 and the third mast member 130. The upper second slider 125 and the lower second slider 136 are formed into L-shaped plate shapes using a resin material. The upper second slider 125 is secured to an outer corner of the upper portion of the second mast member 120 such that an inner corner of the third mast member 130 is brought into slidable contact therewith. The lower second slider 136 is disposed below the upper second slider 125 in the clearance between the second mast member 120 and the third mast member 130. The lower second slider 136 is secured to an inner corner of the lower portion of the third mast member 130 such that an outer corner of the second mast member 120 is brought into slidable contact therewith.

An upper third slider 135 and a lower third slider 146 that allow the third mast member 130 and the fourth mast member 140 to relatively move are disposed at each of four corners of the clearance between the third mast member 130 and the fourth mast member 140. The upper third slider 135 and the lower third slider 146 are formed into L-shaped plate shapes using a resin material. The upper third slider 135 is secured to an outer corner of the upper portion of the third mast member 130 such that an inner corner of the fourth mast member 140 is brought into slidable contact therewith. The lower third slider 146 is disposed below the upper third slider 135 in the clearance between the third mast member 130 and the fourth mast member 140. The lower third slider 146 is secured to an inner corner of the lower portion of the fourth mast member 140 (see FIG. 7 as well) such that an outer corner of the third mast member 130 is brought into slidable contact therewith.

A back upper-side fourth slider 155 and a back lower-side fourth slider 156 that allow the fourth mast member 140 and the fifth mast member 150 to relatively move are disposed at each of back corners of the clearance between the fourth mast member 140 and the fifth mast member 150. The back upper-side fourth slider 155 and the back lower-side fourth slider 156 are formed into L-shaped plate shapes using a resin material. A front upper-side fourth slider 157 and a front lower-side fourth slider 158 that allow the fourth mast member 140 and the fifth mast member 150 to relatively move are disposed at each of front corners of the clearance between the fourth mast member 140 and the fifth mast member 150. The front upper-side fourth slider 157 and the front lower-side fourth slider 158 are formed into L-shaped plate shapes using a resin material.

Figure 1:
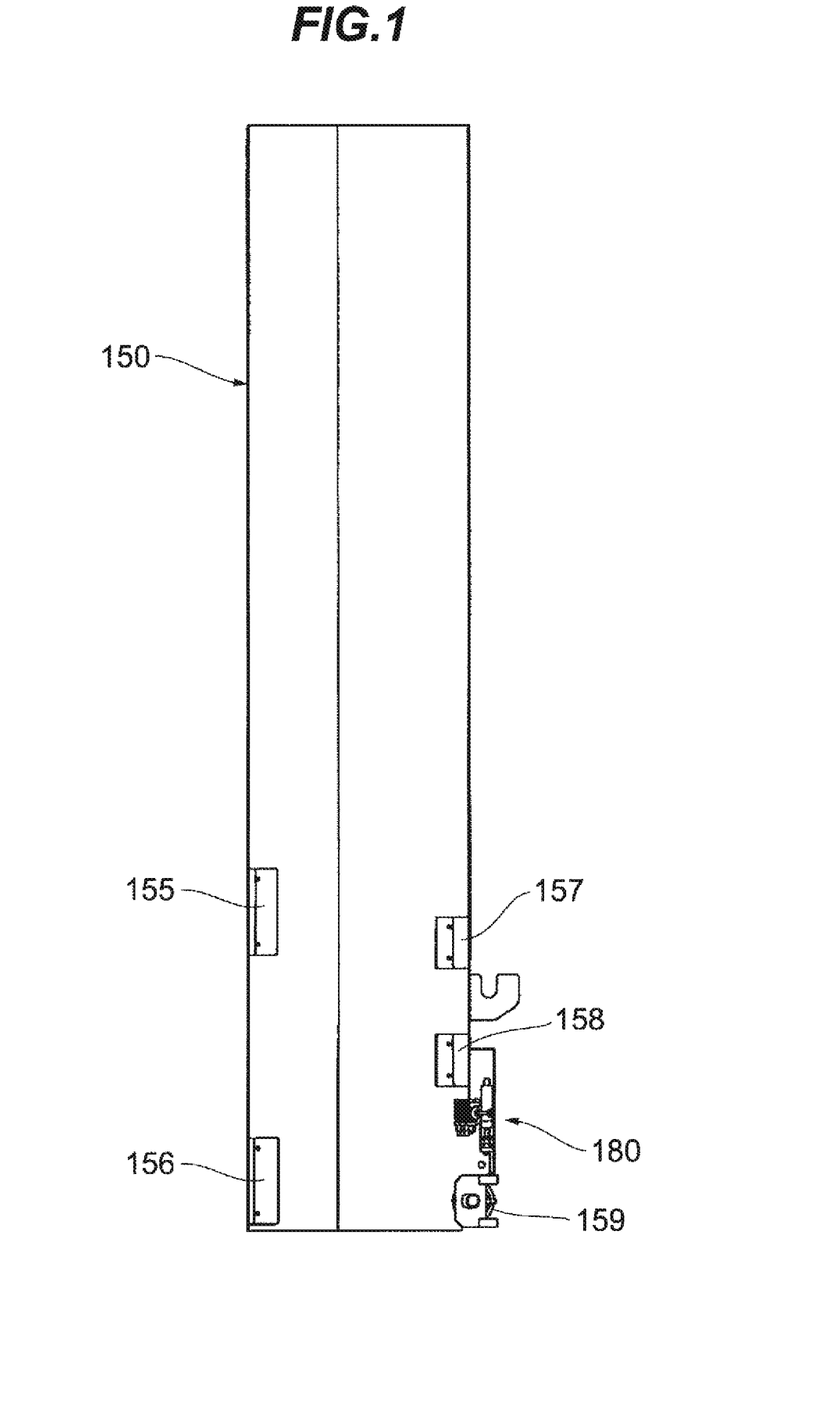
FIG. 1 is a side sectional view of a fifth mast member (top mast member).

As illustrated in FIG. 1 as well, the back upper-side fourth slider 155 is secured to an inner corner of an intermediate portion of the fifth mast member 150 (on the back side) such that an outer corner of the fourth mast member 140 (on the back side) is brought into slidable contact therewith. The back lower-side fourth slider 156 is disposed below the back upper-side fourth slider 155 at each of back corners of the clearance between the fourth mast member 140 and the fifth mast member 150. The back lower-side fourth slider 156 is secured to an inner corner of the lower portion of the fifth mast member 150 (on the back side) such that an outer corner of the fourth mast member 140 (on the back side) is brought into slidable contact therewith.

The front upper-side fourth slider 157 is secured to an inner corner of an intermediate portion of the fifth mast member 150 (on the front side) such that an outer corner of the fourth mast member 140 (on the front side) is brought into slidable contact therewith. The front lower-side fourth slider 158 is disposed below the front upper-side fourth slider 157 at each of front corners of the clearance between the fourth mast member 140 and the fifth mast member 150. The front lower-side fourth slider 158 is secured to an inner corner of a lower side (in the vicinity of the upper side of the load detection means 180) of the intermediate portion of the fifth mast member 150 (on the front side) such that an outer corner of the fourth mast member 140 (on the front side) is brought into slidable contact therewith.

In the vehicle with an aerial work platform 1 configured as described above, the first to third cylinders 161 to 163 are operated to extend in order to extend the first to fifth mast members 110 to 150 of the lifting and lowering apparatus 100 and lift the work platform 3 (from a lower position). At this time, the second mast member 120 relatively moves upward with respect to the first mast member 110 by the first cylinder 161 being operated to extend. The third mast member 130 relatively moves upward with respect to the second mast member 120 by the second cylinder 162 being operated to extend. The fourth mast member 140 relatively moves upward with respect to the third mast member 130 by the third cylinder 163 being operated to extend. If the fourth mast member 140 relatively moves upward with respect to the third mast member 130, then the fifth mast member 150 is pulled upward via the sprocket 147 and the chain 171 and relatively moves upward with respect to the fourth mast member 140.

In order to cause the first to fifth mast members 110 to 150 to contract and thereby to lower the work platform 3 (from an upper position), the first to third cylinders 161 and 163 are operated to contract. At this time, the second mast member 120 relatively moves downward with respect to the first mast member 110 by the first cylinder 161 being operated to contract. The third mast member 130 relatively moves downward with respect to the second mast member 120 by the second cylinder 162 being operated to contract. The fourth mast member 140 relatively moves downward with respect to the third mast member 130 by the third cylinder 163 being operated to contract. If the fourth mast member 140 relatively moves downward with respect to the third mast member 130, then the fifth mast member 150 is pulled downward via the sheave 148 and the wire 175 and relatively moves downward with respect to the fourth mast member 140.

If an operator boards on the work platform 3 or a loaded article is mounted thereon when the work platform 3 is lifted or lowered using the lifting and lowering apparatus 100, the mounted load on the work platform 3 acts on the fifth mast member 150 in addition to the weight of the work platform 3 its own. In response to the load, the fifth mast member 150 acts against the bias force from the spring member for a chain 183 and relatively moves downward with respect to the bracket member 181 connected to the other end portion of the chain 171. At this time, the switch abutting member 187 attached to the fifth mast member 150 (abutting member attachment portion 152) attempts to relatively move downward with respect to the limit switch 185 attached to the bracket member 181 and separate therefrom. However, in a case in which the mounted load on the work platform 3 falls within the rated load, the switch abutting member 187 abuts on the rod portion 186 of the limit switch 185, and the limit switch 185 is turned into an ON state. If the mounted load on the work platform 3 exceeds the rated load, then the switch abutting member 187 separates the rod portion 186 of the limit switch 185 beyond the reference position below the non-mounted position, and the limit switch 185 is turned into an OFF state. In this manner, the load detection means 180 according to the embodiment can detect whether or not the mounted load on the work platform 3 falls within the rated load. In the embodiment, the reference position is a relative position of the fifth mast member 150 (with respect to the bracket member 181) when the mounted load on the work platform 3 is the rated load.

According to the embodiment, the back upper-side fourth slider 155, the back lower-side fourth slider 156, the front upper-side fourth slider 157, and the front lower-side fourth slider 158 disposed between the fifth mast member 150 and the fourth mast member 140 are secured to the fifth mast member 150, the positional relationships of these sliders are thus constant even if the fifth mast member 150 and the fourth mast member 140 relatively move when the first to fifth mast members 110 to 150 extend or contract. In this manner, a moment of a force acting on the back upper-side fourth slider 155, the back lower-side fourth slider 156, the front upper-side fourth slider 157, and the front lower-side fourth slider 158 does not change even if the fifth mast member 150 and the fourth mast member 140 relatively move, a sliding resistance between the fifth mast member 150 and the fourth mast member 140 is thus substantially constant. Therefore, it is possible to enhance accuracy of detection of the load on the work platform 3 using the load detection means 180 configured to detect the load applied to the fifth mast member 150 and detect whether or not the mounted load on the work platform 3 falls within the rated load.

Also, the load detection means 180 is configured to have the bracket member 181 that is able to relatively move in the up-down direction with respect to the fifth mast member 150, the spring member for a chain 183 that applies a bias force against the load acting on the bracket member 181 from the fifth mast member 150 and keeps the up-down relative position of the fifth mast member 150 at a predetermined position with respect to the bracket member 181, and the limit switch 185 that detects the up-down relative position of the fifth mast member 150 with respect to the bracket member 181 that changes in accordance with the load applied to the fifth mast member 150. Since the load detection means 180 has a simple configuration as described above, it is possible to enhance precision of detection of the load on the work platform 3 using the load detection means 180 and also to reduce manufacturing costs of the vehicle with an aerial work platform 1.

Note that the extending and contracting means 160 has the rotatable sheave 148 that is provided at the lower portion of the fourth mast member 140 and the wire 175 that is put around the sheave 148, is connected to the upper portion of the third mast member 130 on one end side, and is connected to the lower portion of the fifth mast member 150 on the other end side. In this manner, if the fourth mast member 140 relatively moves upward with respect to the third mast member 130, then the fifth mast member 150 is pulled upward via the sprocket 147 and the chain 171 and relatively moves upward with respect to the fourth mast member 140. If the fourth mast member 140 relatively moves downward with respect to the third mast member 130, then the fifth mast member 150 is pulled downward via the sheave 148 and the wire 175 and relatively moves downward with respect to the fourth mast member 140. Therefore, it is possible to reliably cause the fifth mast member 150 to relatively move in the up-down direction with respect to the fourth mast member 140. The up-down relative position of the fifth mast member 150 with respect to the bracket member 181 when the mounted load on the work platform 3 is the rated load is defined as the reference position, and the limit switch 185 detects that the fifth mast member 150 has moved beyond the reference position and thus detect that the mounted load has exceeded the rated load. In this manner, it is possible to detect whether or not the mounted load on the work platform 3 falls within the rated load.

Also, the roller members 159 that are rotatable while abutting on the fourth mast member 140 are provided in the vicinity of the load detection means 180 at the lower portion of the fifth mast member 150. In this manner, even in a case in which the load detection means 180 is provided at the lower portion of the fifth mast member 150 and it is difficult to dispose the sliders at the disposition position of the load detection means 180 between the fifth mast member 150 and the fourth mast member 140, the roller members 159 provided at the fifth mast member 150 can guide relative movement of the fifth mast member 150 and the fourth mast member 140. Even with such a configuration, a sliding resistance between the fifth mast member 150 and the fourth mast member 140 becomes substantially constant, and it is possible to enhance accuracy of detection of the load on the work platform 3 using the load detection means 180.

Although the configuration in which the traveling carriage 2 is provided with the traveling wheels 22 has been exemplified as the vehicle with an aerial work platform 1 in the aforementioned embodiment, the present invention is not limited thereto, and a configuration in which the traveling carriage is provided with a crawler may be employed.

Although the first to third cylinders 161 to 163 are configured to directly extend and contract the first to fourth mast members 110 to 140 in the aforementioned embodiment, the present invention is not limited thereto. The number of mast members that are provided so as to be caused to extend or contract directly by the cylinders may be, for example, three or five, and any number is applicable as long as a plurality of mast members are provided.

Although the limit switch 185 of the load detection means 180 is configured to be able to detect whether or not the mounted load on the work platform 3 falls within the rated load in the aforementioned embodiment, the present invention is not limited thereto. For example, a configuration in which a stroke sensor capable of detecting the amount of relative movement of the fifth mast member 150 (from the non-mounted position) is able to successively detect the mounted load on the work platform 3 may be employed.

Although the switch abutting member 187 is provided below the limit switch 185 at the fifth mast member 150, and the limit switch 185 is configured to be turned into an OFF state by the switch abutting member 187 separating from the rod portion 186 of the limit switch 185 if the mounted load on the work platform 3 exceeds the rated load in the aforementioned embodiment, the present invention is not limited thereto. For example, a configuration in which the switch abutting member is provided above the limit switch at the fifth mast member 150 and the limit switch is turned into an ON state by the switch abutting member reaching the reference position below the non-mounted position and then abutting the rod portion of the limit switch if the mounted load on the work platform 3 exceeds the rated load may be employed. Note that in a case in which the mounted load on the work platform 3 falls within the rated load in this configuration, the switch abutting member separates upward from the rod portion of the limit switch, and the limit switch is turned into an OFF state. In this configuration, it is also possible to successively detect the mounted load on the work platform 3 using a stroke sensor capable of detecting the amount of relative movement of the fifth mast member 150 (from the non-mounted position) instead of the limit switch.

EXPLANATION OF NUMERALS AND CHARACTERS

1 Vehicle with aerial work platform
2 Traveling carriage
3 Work platform
100 Lifting and lowering apparatus
110 First mast member
120 Second mast member
130 Third mast member
140 Fourth mast member
147 Sprocket
150 Fifth mast member
155 Back upper-side fourth slider
156 Back lower-side fourth slider
157 Front upper-side fourth slider
158 Front lower-side fourth slider
159 Roller member
160 Extending and contracting means
161 First cylinder
162 Second cylinder
163 Third cylinder
171 Chain
180 Load detection means
181 Bracket member
183 Spring member for a chain
185 Limit switch

The invention claimed is:

1. A vehicle with an aerial work platform comprising:
a vehicle body that is able to travel;
a lifting and lowering apparatus that is provided in the vehicle body; and
a work platform that is provided on the lifting and lowering apparatus and allows an operator to board thereon,
wherein
the lifting and lowering apparatus has a plurality of mast members that are provided on the vehicle body so as to extend in an up-down direction and are allowed to extend and contract by being assembled in a telescopic form so as to be able to relatively move in the up-down direction,
the plurality of mast members include
a top mast member that is disposed on an outermost and uppermost side, and
a top-side intermediate mast member that is assembled in a telescopic form inside the top mast member so as to be able to relatively move in the up-down direction with respect to the top mast member,
the work platform is mounted on the top mast member extending laterally and outwardly,
the vehicle further comprising:
an extending and contraction apparatus which is configured to move the top mast member with respect to the top-side intermediate mast member in the up-down direction,
a load detection apparatus which is configured to detect a load applied to the top-side intermediate mast member from the top mast member in order to detect a mounted load on the work platform,
a plurality of sliders that allow the top mast member to relatively and smoothly move with respect to the top-side intermediate mast member in the up-down direction,
the plurality of sliders being disposed between the top mast member and the top-side intermediate mast member at positions that are different from each other in the up-down direction, and
the plurality of sliders being secured to the top mast member.

2. The vehicle with the aerial work platform according to claim 1,
wherein the plurality of mast members include a base-side intermediate mast member that is assembled in a telescopic form inside the top-side intermediate mast member so as to be able to relatively move in the up-down direction with respect to the top-side intermediate mast member,
the extending and contraction apparatus has
an actuator that moves the top-side intermediate mast member with respect to the base-side intermediate mast member in the up-down direction,
a rotatable sprocket that is provided at an upper portion of the top-side intermediate mast member, and
a chain that is put around the rotatable sprocket, is connected to an upper portion of the base-side intermediate mast member on one end side, and is connected to a lower portion of the top mast member on the other end side,
when the actuator of the extending and contracting apparatus is extended or contracted, by a function of the rotatable sprocket and the chain, the top mast member is moved with respect to the top-side intermediate mast member in the up-down direction, and at the same time the top-side intermediate mast member is moved with respect to the base-side intermediate mast member in the up-down direction, and
the load detection apparatus has
a bracket member that is connected to the other end side of the chain, is disposed at the lower portion of the top mast member, and is able to relatively move in the up-down direction with respect to the top mast member,
a spring member which is provided between the lower portion of the top mast member and the bracket member, for applying a bias force against a load acting on the bracket member from the top mast member and keeping an up-down relative position of the top mast member at a predetermined position with respect to the bracket member, and a position detector that detects the up-down relative position of the top mast member with respect to the bracket member that changes in accordance with the load applied to the top mast member.

3. The vehicle with the aerial work platform according to claim 2, wherein the extending and contraction apparatus has a rotatable sheave that is provided at a lower portion of the top-side intermediate mast member, and a wire that is put around the rotatable sheave, is connected to the upper portion of the base-side intermediate mast member on one end side, and is connected to the lower portion of the top mast member on the other end side.

4. The vehicle with the aerial work platform according to claim 2, wherein the up-down relative position of the top mast member with respect to the bracket member when the mounted load on the work platform is a rated load is defined as a reference position, and the position detector detects that the top mast member has moved beyond the reference position and thus detects that the mounted load has exceeded the rated load.

5. The vehicle with the aerial work platform according to claim 1, wherein the load detection apparatus is provided at a lower portion of the top mast member, and roller members that are rotatable while abutting on the top-side intermediate mast member are provided in the vicinity of the load detection apparatus at the lower portion of the top mast member.

* * * * *